Sept. 9, 1969     J. H. DUYMELINCK ET AL     3,465,780
VALVE, MAINLY FROM SYNTHETIC MATERIAL SUCH AS
PLASTIC, FOR AIR TUBES AND METHOD OF
MANUFACTURING OF THE SHAFT
OF SUCH A VALVE
Filed Feb. 27, 1967
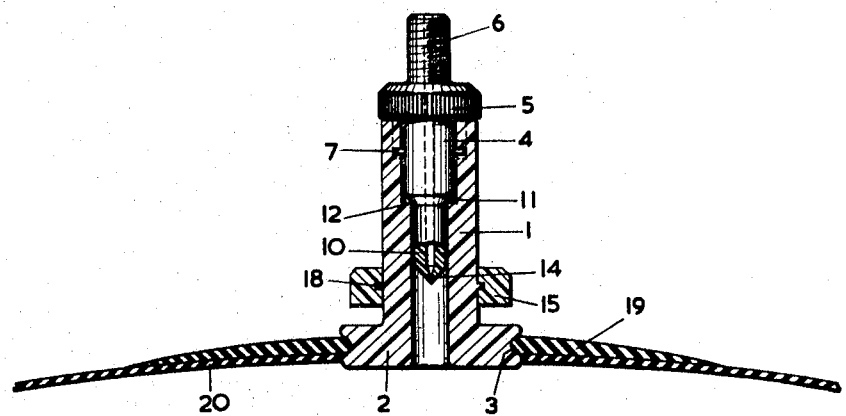
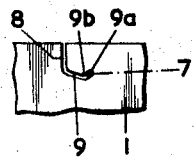
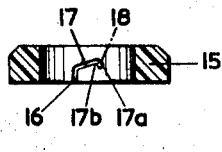

United States Patent Office 3,465,780
Patented Sept. 9, 1969

3,465,780
VALVE, MAINLY FROM SYNTHETIC MATERIAL SUCH AS PLASTIC, FOR AIR TUBES AND METHOD OF MANUFACTURING OF THE SHAFT OF SUCH A VALVE
Jacobus Henricus Duymelinck, 1 Dr. Arienslaan, Helmond, Netherlands, and Rients Schootstra, 430 Keppelseweg, Doetinchem, Netherlands
Filed Feb. 27, 1967, Ser. No. 618,805
Int. Cl. F16k 15/20
U.S. Cl. 137—234.5      4 Claims

ABSTRACT OF THE DISCLOSURE

A valve for an air tire or inner tube and method for manufacturing the shaft thereof. The valve is essentially made from a synthetic material such as plastic. The valve nipple constitutes one part with a manually engageable flange or the like replacing the usual ring nut. The nipple engages by a bayonet joint in the interior of the valve shaft and the rim nut engages by a bayonet joint around the shaft. In the method a plaster to be bonded to the air tube is used as part of a mold for making the shaft.

---

This invention relates to a valve mainly from synthetic material such as plastic for an air tube, such as an inner tire tube, and to a method for manufacturing the shaft of such a valve.

A valve for a bicycle, which valve is made from plastic, is known, which in structure is almost identical to the usual metal bicycle tube valves. It has a ring nut engaging the shaft by threaded parts for pressing down the nipple, a rim nut engaging around the shaft by screw threaded parts and a nut part for connecting the valve to the inner air tube.

The present invention aims at simplifying considerably the structure of a valve for an air tube and to adapt this structure to the requirements made by synthetic materials such as plastics as to operation and manufacture.

To attain these objects a valve mainly from synthetic material such as plastic for an air tube is according to the invention characterized in that the valve nipple constitutes one part with a part to be engaged by the hand and replacing the ring nut, such as a flange, that the nipple engages the shaft in the interior thereof by a bayonet joint and is thereby pushed upon an edge in the shaft for sealing, the rim nut also engaging around and on the shaft by a bayonet joint.

The application of screw threaded parts on the valve structure is thereby entirely avoided, or is avoided with the exception of a part on which an air pump could engage as many air pumps still have screw threaded female nipple parts, and the number of parts from which the valve is constituted is considerably decreased. The application of screw threaded parts for a plastic valve would mean that the mounting would take more time as the plastic has a much lower specific gravity than metal and mostly has much more friction, so that the nut parts will not remain rotating by their own inertia, as is the case with steel.

Preferably the nipple moreover has lips being very thin at their free ends and pressing against one another, which lips are moved away from one another by air pressure from the outside in a resilient manner, It is preferable to have these lips extend in an inclined manner towards one another.

Moreover it is according to the invention preferable to embody the valve in such a way that the shaft at the lower end has a connecting flange within the outer peripheral surface an annular groove, in which a plaster, for instance from rubber, engages with its inner periphery. This plaster preferably plays a role in manufacturing the shaft from the synthetic material as it could form part of the wall of the mould cavity in making the shaft so that the shaft is moulded into one unitary structure with the plaster and thereby is rigidly connected to the plaster. It is thereafter possible to glue, cure or vulcanize the plaster, which is now provided with the shaft, to the inner air tube. A number of plasters could be united to a ribbon, in which orifices for forming the shafts of the valves therein are provided, which ribbon is moved stepwise through a mould for making the shafts, after which the ribbon, if desired along weakened parts made therein before making the shafts, is separated into separate plasters.

In this respect it is remarked that a metal bicycle valve with a flange at the lower end and a plaster vulcanized around said flange for mounting to an inner air tube is known. This known plaster, however, does not engage into a groove of the flange and is not used as a mould part for making the shaft of the valve.

When applying the invention it is possible to prevent that the valve itself becomes too hot, e.g. during vulcanization, which is not allowable for many plastics.

Of course it is also possible to mould the shafts first and to form the plasters there around in a later stage, so that the shaft acts as a mould part for the plaster, but this is in general less preferable because the shaft could become too hot.

As a plastic for the valve several substances could be used, preferably nylon and in general deformation- and shock-resistant synthetic materials, not to weak and especially thermoplastic materials.

The invention will now be explained further with reference to the enclosed drawing giving by way of example only a possibility of embodiment of a valve according to this invention. In this drawing:

FIGURE 1 is an axial section through a valve for a bicycle tube according to the invention also showing the neighbouring parts of the inner air tube.

FIGURE 2 is an inner view of the upper part of the shaft in a condition developed into a plane.

FIGURE 3 is an axial section perpendicular to the sectional plane of FIGURE 1 through the rim nut of such a valve.

The valve shown in the drawing consists of nylon. It has a shaft 1, forming one single part with a flange 2 at its lower end, said flange having at its outer periphery an annular groove 3. The nipple is formed by a body 4 constituting one single body with a flange 5 and a nipple part proper 6, onto which a bicycle pump may engage. This body also consists of nylon. The nipple part 6 has screw thread because many bicycle pumps have screw threaded female nipples. The flange 5 is knurled at its outer periphery so that it may easily be rotated by hand. The nipple 4 has two diametrically opposite protruding lugs 7 and the shaft 1 has, extending from the upper face thereof, two diametrically opposite axial grooves 8, which at their lower end pass into an inclined sideways extending part 9, having at its end a somewhat returning groove part 9a, so that a locking edge 9b is formed (FIGURE 2). The nipple 4 has at its lower end a narrower part 10, which passes into the main part 4 by a conical surface 11. The shaft 1 has internally a stepped transition 12 between a wider upper part and a narrower lower part. The nipple 4 is adapted to make sealing contact with the inner edge of this transition. In principle it would also be possible to have the nipple 4 make sealing contact by its flange 5 on the upper surface of the shaft 1 under the influence of the bayonet joint 7, 8, 9, but this will in general not give such a good seal against air pressure losses. The nipple 4 at its lower end has two inclined inwardly extending lips 14, being plane and contacting one another with their lower end resiliently. Thus in this area the nipple is not circular and the lips are in contact with one another in such a way that they form a straight slot therebetween, which is normally kept closed resiliently by the lips. Thus the application of a small valve hose at usual is superfluous. The lips 14 close the opening in the lips normally, but when inflating the tire they diverge resiliently for allowing the air to pass. The air pressure in the inner tube presses on the lips 14, so that the slot therebetween is normally kept closed reliably.

The rim nut 15 internally does not have screw thread and the shaft 1 externally does not have screw thread. As appears from FIGURE 3 the rim nut has internally, extending from the lower surface thereof, a vertical groove 16, which passes at its upper end into an inclined groove 17, terminating in a somewhat returning part 17a, so that a lock edge 17b is formed. The shaft 1 has externally two diametrically opposite lugs 18 and thus a bayonet joint is obtained, by which the rim nut 15 is adapted to clamp the rim between itself and the flange 2 for securing the valve to the rim of the bicycle wheel or the like.

The described bayonet joints 7, 8, 9, 9a, 9b and 16, 17, 17a, 17b, 18 could also be embodied without a returning part 9a and 17a respectively and without lock edges 9b and 17b respectively, provided that the inherent friction is sufficiently high to prevent loosening reliably. Particularly with rigid synthetic materials this could be preferable to maintain a good clamping also when the valve 1 ages. Normally suitable plastics such as nylon are, however, sufficiently weak to guarantee a good and sufficient clamping and sealing also in a fixed mutual locking position of the bayonet joint parts with a fixed terminal locking position as described.

In the groove 3 of the flange 2 a plaster 19 is made by moulding or is bonded to said flange, which plaster is adapted to be bonded, cured or vulcanized to the inner air tube 20. Said tube has an opening which is larger than the largest diameter of the flange 2. When making the valve according to the invention it is possible to make the plaster 19 with the shaft 1, which now is intimately the plaster 19 itself borders and forms part of the wall of the mould cavity, in which cavity thereafter the shaft 1 may be manufactured. When bonding or vulcanizing the plaster 19 with the shaft 1, which now is initimately connected thereto, to the air tube, the valve itself needs not become so hot that this would be disadvantageous for the plastic in view of weakening etc.

If desired the nipple 1 could, contrary to what is shown in the drawing, be embodied with a groove above the conical part 11 and with a sideways opening from the central bore, which bore in that case is closed at the lower end. Thus the nipple could be provided with a usual small valve hose if this is preferred.

Having described our invention, we claim:

1. A valve for an inflatable air receptacle such as an inner tire tube, the valve comprising; a hollow shaft of plastic material adapted to be secured to the wall of the inflatable air receptacle and extend outwardly therefrom, a hollow plastic valve nipple having an integral flange intermediate the ends thereof for rotation of the nipple by hand and a check valve on one end comprising lip sealing means integral with the nipple, the other end of the nipple forming engagement means for an air source, the nipple extending into the hollow shaft so that the flange and engagement means are outwardly of the end of the hollow shaft and the check valve is within the hollow shaft, a first bayonet joint between the shaft and nipple for holding the nipple in the hollow shaft, a sealing portion of the inside of the hollow shaft sealing with the outside of the nipple when the first bayonet joint is engaged, a plastic rim nut on the outside of the shaft, and a second bayonet joint between the rim nut and outside of the shaft.

2. A valve as in claim 1 wherein the lip sealing means comprises two opposite lips on the nipple having thin free ends and engaging one another at the free ends such that the lips free ends move resiliently away from one another when air pressure is applied to the outside end of the nipple.

3. A valve as in claim 2 wherein the lips extend in an inclined manner toward one other and are secured to the end of the nipple inside the hollow shaft.

4. A valve as in claim 1 wherein the shaft at the lower end has a connecting flange with an annular groove in its outer peripheral surface and a plaster for connecting to the flange engaged with said annual groove.

References Cited

UNITED STATES PATENTS

| 621,849 | 3/1899 | Rickman | 137—525.1 X |
| 623,029 | 4/1899 | McCollum | 137—525.1 X |
| 1,596,320 | 8/1926 | Sonnett | 137—223 |
| 2,082,972 | 6/1937 | Perry | 152—427 X |
| 2,634,785 | 4/1953 | Tubbs | 137—223 X |

FOREIGN PATENTS

| 426,786 | 4/1935 | Great Britain. |

WILLIAM F. O'DEA, Primary Examiner

D. H. LAMBERT, Assistant Examiner

U.S. Cl. X.R.

29—157.1; 152—429